United States Patent
Ogawa et al.

(10) Patent No.: US 6,829,518 B2
(45) Date of Patent: Dec. 7, 2004

(54) NUMERICAL CONTROL APPARATUS

(75) Inventors: Shuji Ogawa, Yamanashi (JP); Hideo Ogino, Fujiyoshida (JP)

(73) Assignee: Fanuc LTD, Yamanashi (JP)

( * ) Notice: Subject to any disclaimer, the term of this patent is extended or adjusted under 35 U.S.C. 154(b) by 0 days.

(21) Appl. No.: 10/815,663

(22) Filed: Apr. 2, 2004

(65) Prior Publication Data

US 2004/0210338 A1 Oct. 21, 2004

(30) Foreign Application Priority Data

Apr. 15, 2003 (JP) ........................................ 2003-110122

(51) Int. Cl.[7] .............................................. G06F 19/00
(52) U.S. Cl. ........................ 700/174; 700/108; 318/569
(58) Field of Search ................................ 700/174, 160, 700/170, 169, 247, 186, 56, 181, 108, 195, 16; 318/569, 601

(56) References Cited

U.S. PATENT DOCUMENTS 5,514,941 A * 5/1996 Kita ............................ 318/569
5,850,338 A * 12/1998 Fujishima ....................... 700/3
6,625,498 B1 * 9/2003 Kurakake et al. .............. 700/3

FOREIGN PATENT DOCUMENTS

| JP | 10-143220 | 5/1998 |
| JP | 2001-034317 | 2/2001 |

* cited by examiner

Primary Examiner—Kidest Bahta
(74) Attorney, Agent, or Firm—Staas & Halsey LLP

(57) ABSTRACT

Any commands, selected in a program, are set as a reference time data command, an elapsed time data command and a time data command. The program is read and original processing of the commands is performed, and if the reference time data command is read, a time then is stored as a reference time. If the elapsed time data command is read, elapsed time from the reference time is acquired and stored as execution elapsed time. If the time data command is read, the time then is stored as an execution time. Thus, it is possible to easily check the execution time of any program command.

9 Claims, 8 Drawing Sheets

NUMERICAL CONTROL APPARATUS

BACKGROUND OF THE INVENTION

1. Field of the Invention

The present invention relates to a numerical control apparatus for controlling a machine tool.

2. Description of the Related Art

As for a machine tool controlled by a numerical control apparatus, a machining program in the case of forming a work shape generally comprises a plurality of programs such as roughing, semi-finishing and finishing programs. To reduce machining time, it is necessary to change machining conditions such as a command speed, and there are many cases where such a change should be made in detail in a desired program. For that purpose, it is necessary to measure the time required for various kinds of machining and look for a process capable of time reduction.

Concerning information on the time for program operation of prior art numerical control apparatus in the past, there is prepared information such as recorded information on program start time by means of an operation history function or time information capable of checking accumulated time in a specific operational status including automatic operation time and cutting time by means of an operating time display function. For instance, Japanese Patent Application Laid-Open No. 2001-34317 discloses a unit for detecting and storing a history for each component as to start time, completion time, machine tool operation start time and stop time and seeking operating time for each component.

Japanese Patent Application Laid-Open No. 10-143220 discloses a unit for measuring, storing and displaying operation set-up time, machining time and alarm time of the machine tool.

As described above, the prior art technology detects, stores and displays operating time and alarm stop time of the machine tool and machining time for every component. It is intended to grasp and control a current status of work rather than to detect the machining time and so on for each command of the program executed by the numerical control apparatus. For that reason, the prior art technology does not provide a criterion for reviewing and improving the machining program for the sake of reducing the machining time.

There may be a command, such as a custom macro command, in a machining program, which a user performs calculation of the machining conditions and so on, prior to actually performing machining by operating the machine with the machining program. In program execution of the custom macro command, there will be a difference in execution time due to a mechanism of an analytic process of the numerical control apparatus depending on how a custom macro program is created. For that reason, it is necessary to modify and improve the program so as to enable processing in an optimum and short time. Thus, it may be an important clue to program modification to acquire a time necessary for processing of a specific program such as a custom macro program.

Variables capable of reading the time information are prepared as macro variables. Even in that case, however, it is necessary to create a macro program for obtaining necessary time information by adding a macro program unrelated to a machining program command to an existing machining program. In addition, various output signals for notifying an operational status are prepared. However, it is necessary, as in the case of the macro variables, to create application software for detecting a change in a signal status by using a user application such as a PMC (programmable machine controller) ladder sequence. And it requires knowledge and efforts for creating the PMC ladder sequence. The above-mentioned various output signals for notifying the operational status are not sufficient for obtaining accurate time information since there is a time delay as a signal interface.

SUMMARY OF THE INVENTION

A first form of a numerical control apparatus for controlling a machine tool according to the present invention comprises: means for setting and registering any command, selected from among a plurality of commands described in a program handled by the numerical control apparatus, as a time data command for storing a time at which original contents of the command are executed; clock means for updating a current time and outputting an updated current time; determination means for determining whether or not the command read from the program during execution of the program is a time data command set and registered; time data storage means; and means for, when the read command is determined to be the time data command by said determination means, acquiring the current time from the clock means, apart from execution of the original contents of the command, and writing the acquired time as an execution time to said time data storage means. It is possible, with the numerical control apparatus in this form, to know the execution time of the arbitrarily selected program command.

A second form of the numerical control apparatus for controlling the machine tool according to the present invention comprises: means for setting and registering any command, selected from among a plurality of commands described in a program handled by the numerical control apparatus, as a reference time data command for storing a time at which original contents of the command are executed as a reference time; means for setting and registering a command, different from said selected command, as an elapsed time data command for storing elapsed time from the reference time at which the original contents of the command are executed; clock means for updating a current time and outputting an updated current time; determination means for determining whether or not a command read from the command program during execution of the program is a command set and registered; time data storage means; means for, when determined to be the reference time data command set and registered by the determination means, acquiring the current time from the clock means, apart from execution of the original contents of the command, and writing the acquired time to a time data storage means as a reference time; and means for, when determined to be the elapsed time data command set and registered by the determination means, acquiring the current time from the clock means apart from the execution of the original contents of the command, calculating the elapsed time from the current time and the reference time and writing the calculated time to said time data storage means as an execution elapsed time. It is possible, with the numerical control apparatus in this form, to know the execution elapsed time.

A third form of the numerical control apparatus for controlling the machine tool according to the present invention comprises: means for setting and registering any command, selected from among a plurality of commands described in a command program handled by the numerical control apparatus, as an elapsed time data command for storing elapsed time; timekeeping means for measuring time; determination means for determining whether or not the command read from the command program during execution of the command program is a elapsed time data command set and registered; time data storage means; and means for, when determined to be the elapsed time data command by the determination means, acquiring the elapsed time from the execution time of the last elapsed time data command, apart from the execution of the original contents of the elapsed time data command, based on said timekeeping means and writing the acquired time to said time data storage means as execution elapsed time.

A fourth form of the numerical control apparatus for controlling the machine tool according to the present invention comprises: means for setting and registering any command, selected from among a plurality of commands described in a command program handled by the numerical control apparatus, as a reference time data command for storing the time at which the original contents of the command are executed as a reference time; means for setting and registering a command, different from the selected command, as an elapsed time data command for storing elapsed time from the reference time at which original contents of the command are executed; timekeeping means for measuring time; determination means for determining whether or not the command read from the command program during the execution of the program is a command set and registered; time data storage means; means for, when determined to be the reference time data command by the determination means, causing the timekeeping means to start measuring time, apart from the execution of the original contents of the command; and means for, when determined to be the elapsed time data command set and registered by the determination means, acquiring the elapsed time measured by the timekeeping means, apart from the execution of the original contents of the command, and writing the acquired time to said time data storage means.

As for the numerical control apparatus in the fourth form, the timekeeping means may be comprised of clock means for outputting time; and the means for writing the execution elapsed time to the time data storage means may read, when determined to be the command set and registered, the time from the clock means and write the read time to said storage means, and also acquires the elapsed time from a difference between the time read out by the clock means this time and the time stored last time so as to write the acquired time as the execution elapsed time.

A fifth form of the numerical control apparatus for controlling the machine tool according to the present invention comprises: means for setting and registering any command, selected from among a plurality of commands described in a command program handled by the numerical control apparatus, as an elapsed time data command for storing elapsed time; timekeeping means for measuring time; determination means for determining whether or not the command read from the command program during execution of the program is an elapsed time data command set and registered; time data storage means: and means for, when determined to be the elapsed time data command by the determination means, reading the measured time from the timekeeping means, apart from the execution of the original contents of the elapsed time data command, writing the read time to said time data storage means as execution elapsed time and resetting the timekeeping means to start time measuring.

As for the numerical control apparatuses in the first to fifth forms, it is possible to provide means for determining whether the original contents of the command set and registered are a program annotation portion itself or the command having the program annotation portion described in the same block as command, and means for, when determined to have the program annotation portion, writing a comment registered as program annotation portion together to the time data storage means. Furthermore, it is possible to comprise means for displaying the data to be stored by the time data storage means on a display unit of the numerical control apparatus. It is also possible to comprise communication means for outputting the data to be stored by the time data storage means from the numerical control apparatus to the outside.

According to the present invention, it is possible to provide the numerical control apparatus capable of easily checking the execution time of a desired program command.

BRIEF DESCRIPTION OF THE DRAWINGS

The aforementioned and other objects and characteristics of the present invention will be clarified in the following descriptions of the embodiments by referring to the attached drawings of which.

DESCRIPTION OF THE EMBODIMENTS

Figure 1:
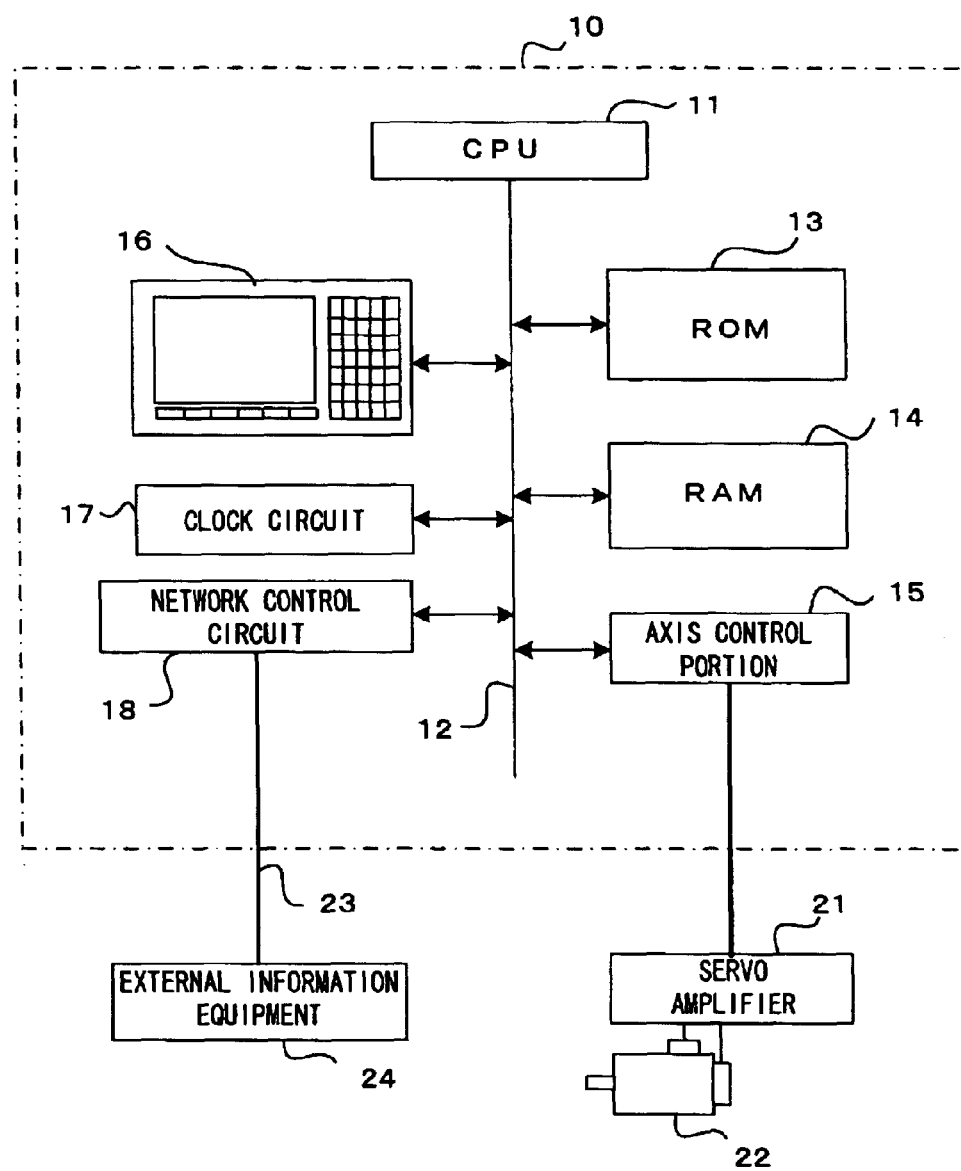
FIG. 1 is a block diagram of relevant parts of a numerical control apparatus according to a first embodiment of the present invention.

FIG. 1 is a block diagram of relevant parts of a numerical control apparatus according to a first embodiment of the present invention.

A microprocessor (CPU) 11 for controlling a numerical control apparatus 10 is connected to an ROM 13, an RAM 14, a axis control portion 15, a display and operation panel 16, a clock circuit 17 and a network control circuit 18 via a bus 12.

The microprocessor 11 analyzes a machining program command registered in a memory of the RAM 14 based on a control program written to the ROM 13, and sends information on a movement command to the axis control portion 15. The axis control portion 15 calculates a movement pulse for each determined distribution period and performs acceleration and deceleration processing, and then sends movement pulse data to each servo amplifier 21 of each axis of a machine connected to the numerical control apparatus 10. The servo amplifier 21 actually operates a servo motor 22 by inputted movement pulse data (FIG. 1 shows only one servo amplifier 21 and only one servo motor 22).

The time of the clock circuit 17 is always being updated by a circuit of a clock so that a current time can be read as required. In association with the present invention, the RAM 14 uses a partial area of the memory as time data storage means, that is, as a time data memory for recording time data, an elapsed time data memory for recording elapsed time data, and a program command setup data memory for storing information on a specific program command.

The display and operation panel 16 comprises a display such as a liquid crystal or a CRT and manual data input means such as a keyboard. A program command for recording the time and elapsed time is selected, set up and inputted so as to store the information on a specific program command in the program command setup data memory. According to this embodiment, a program command for recording the time data (time data command), a program command for recording the execution time of the program command serving as a reference for acquiring the elapsed time (reference time data command) and a program command for acquiring the elapsed time (elapsed time data command) are selected and inputted from the display and operation panel 16 so as to set and store the above-mentioned program command setup data memory in the RAM 14.

The network control circuit 18 is connected to information equipment 24 such as an external personal computer via a network 23, and sends the above-mentioned time data and so on to the information equipment 24.

Figure 2:
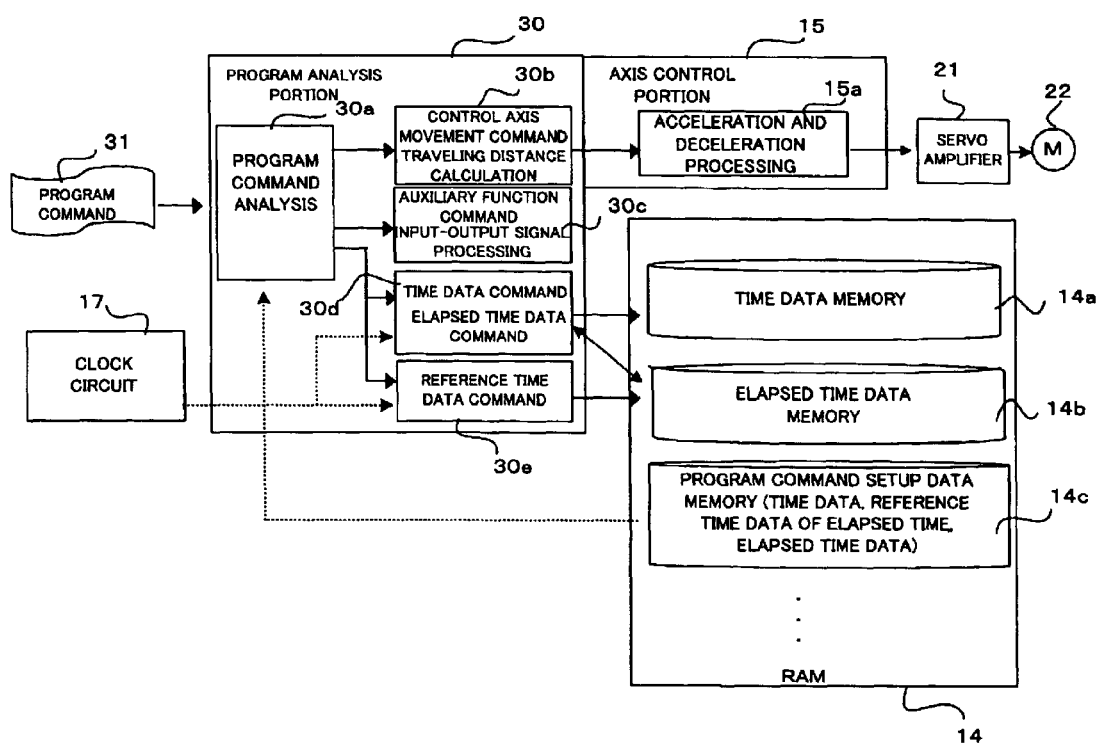
FIG. 2 is a block diagram representing a process of the numerical control apparatus for analyzing a program command in the first embodiment.

FIG. 2 is a block diagram representing a process of the numerical control apparatus for analyzing the program command.

The program analysis portion 30 of the numerical control apparatus 10 reads a program command for each block from a program 31 stored in the RAM 14, and analyzes the program (30a). If the read program command is a movement command of each control axis, it acquires a traveling distance for each control axis at every distribution period (30b) and performs the acceleration and deceleration processing (15a) at the axis control portion 15 of each control axis to output it to the servo amplifier 21 of each axis so as to control driving of the servo motor 22 of each control axis. If the read program command is an auxiliary function command, the numerical control apparatus 10 controls a signal inputted from a peripheral equipment and so on to the numerical control apparatus or a signal outputted to a peripheral equipment based on the auxiliary function command (30c). The above-mentioned processing operation is the same as that of prior art numerical control apparatus.

The present embodiment is characterized in that a program commands for storing the time data, reference time data on the elapsed time and elapsed time data are set and registered as time data command, reference time data command and elapsed time data command in a program command setup data memory 14c in the RAM 14.

When analyzing the program command of the read block in the program analysis portion 30 (30a), the numerical control apparatus 10 determines whether or not the read program command is set and registered in the program command setup data memory 14c.

If the program command is a reference time data command for storing the reference time data on the elapsed time (30e), the numerical control apparatus 10 stores the time read from the clock circuit 17 at a leading address of an elapsed time data memory 14b. If the program command is a time data command for storing the time data (30d), the numerical control apparatus 10 stores the time read from the clock circuit 17 in a time data memory (14a). Furthermore, if the program command is an elapsed time data command for storing the elapsed time data (30d), the numerical control apparatus 10 acquires the elapsed time by subtracting the reference time stored at the leading address of the elapsed time data memory 14b from the time read from the clock circuit 17 so as to store it in the elapsed time data memory (14b).

As will be described later, the data on the time, elapsed time and so on thus stored is displayed on the display on the display and operation panel 16 or a display unit of the external information equipment 24 from the network control circuit 18 via the network 23, so that it is referred to for the sake of program modification.

Figure 3:
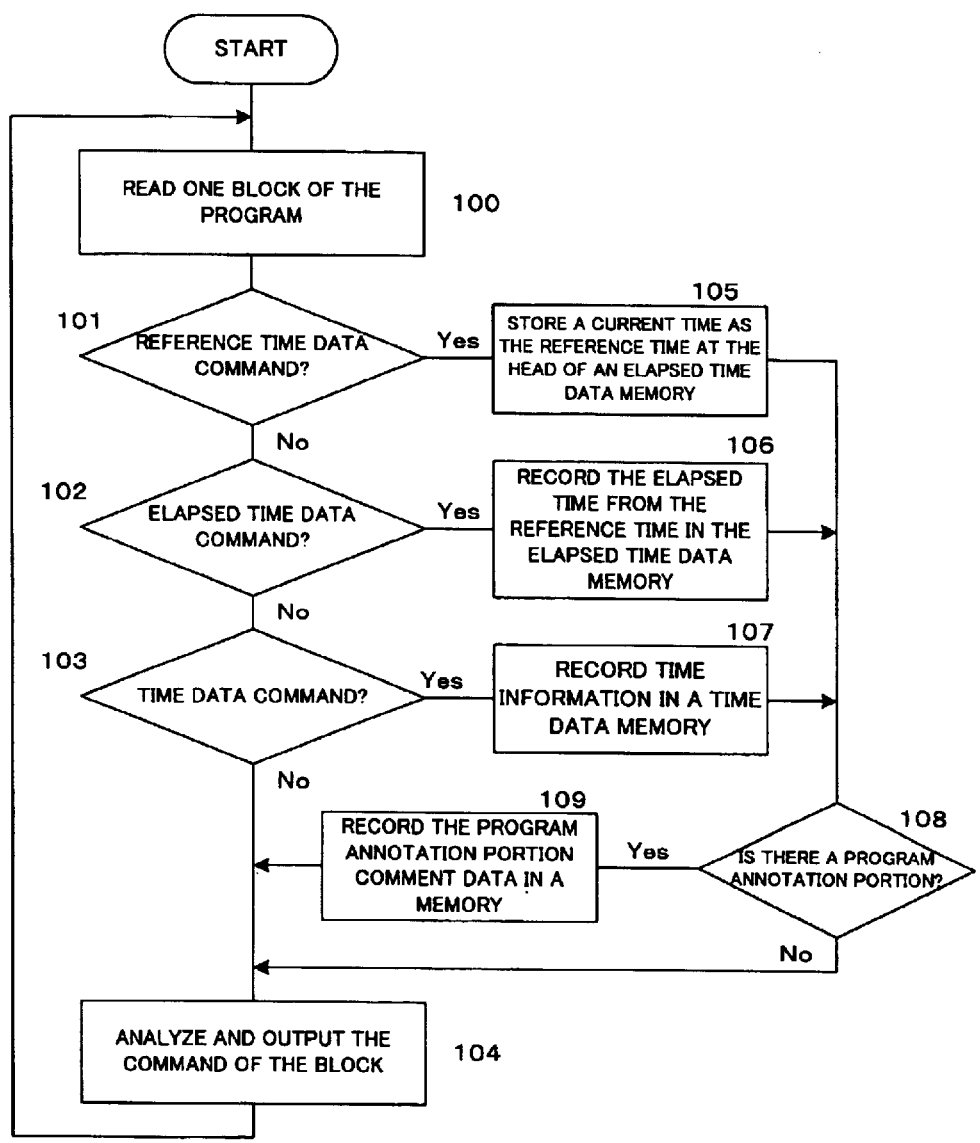
FIG. 3 is a flowchart of a program command analytic process according to the first embodiment.

FIG. 3 is a flowchart showing the process in which the microprocessor 11 analyzes the program registered in the memory in the RAM 14, determines whether the program command is directed to recording of reference time data, recording of elapsed time data, or recording of time data, and stores the time or the elapsed time in corresponding memories, respectively.

The microprocessor 11 reads one block from the program stored in the RAM 14 (step 100), and determines whether the program command of the read block is a reference time data command serving as reference of the elapsed time set and registered in the program command setup data memory (step 101), the elapsed time data command for storing the elapsed time (step 102) or the time data command for storing the time data (step 103). In the case where the program command of the read block is none of these commands, the microprocessor 11 analyzes the program command of the block as before, and outputs analysis results thereof so as to control the driving of the servo motor 22 and so on (step 104). And the program returns to step 100.

In the case where the program command of the read block is registered as reference time data command for storing the reference time data serving as a reference of the elapsed time, the microprocessor 11 reads the current time from the clock circuit 17 and stores it as reference time at the leading address of the elapsed time data memory 14b provided in the RAM 14 (step 105). And the microprocessor 11 determines whether or not there is a "program annotation portion" together with the program command in the read block (step 108). If there is comment data of the "program annotation portion," the microprocessor 11 also stores the comment data in a comment data memory portion corresponding to the stored data on the time in the elapsed time data memory 14b (step 109). And the program proceeds to step 104.

In the case where the program command of the read block is elapsed time data command set and registered so as to store the elapsed time (step 102), the microprocessor 11 reads the current time from the clock circuit 17, calculates the elapsed time from a difference between the read current time and the reference time data already stored, and writes the calculated time to the elapsed time data memory as an elapsed execution time (step 106). And the program proceeds to step 108, and then the microprocessor 11 determines whether or not there is a data on the "program annotation portion." If there is a "program annotation portion," the microprocessor 11 also stores the comment data thereof in the comment data memory portion (step 109) and the program proceeds to step 104. If there is no program annotation portion, the program proceeds from step 108 to step 104.

In the case where the program command of the read block is a time data command for storing the registered time data (step 103), the microprocessor 11 reads the current time from the clock circuit 17 and sets the time as execution time data in the time data memory 14a (step 107), and the program proceeds to the aforementioned next step 108 so as to perform the processing for the "program annotation portion" as previously described.

Next, a concrete application example of this embodiment will be described.

It is assumed that, from among auxiliary function commands to be arbitrarily set up by machine makers wherein the content to be commanded differs dependent upon a machine, which are directed to tool replacement instruction or coolant on/off operation, an auxiliary function command "M999" code, for example, is selected as time data command for storing the time data and stored in the program command setup data memory 14c.

Figure 4:
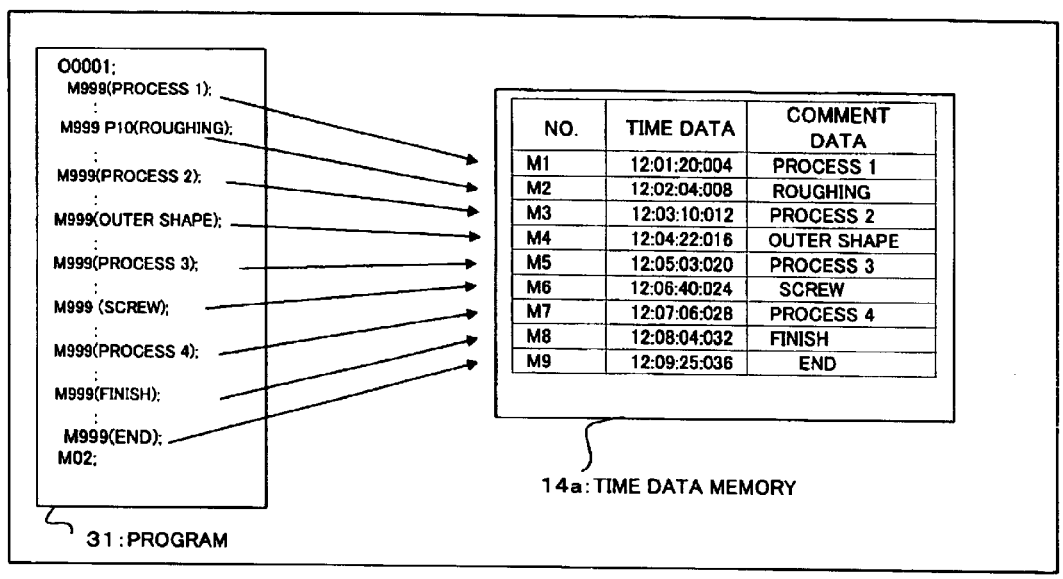
FIG. 4 is an explanatory diagram for explaining a relationship between a program and data stored in a time data memory according to the first embodiment.

FIG. 4 is an explanatory diagram for explaining a relationship between the program 31 and the data stored in the time data memory 14a, in the above case.

The microprocessor 11 executes the program 31 shown in FIG. 4, and reads the program 31 block by block (step 100). When the auxiliary function command "M999", set and registered as time data command for storing the time data, is read, the program proceeds from step 103 to step 107 so as to store the time read from the clock circuit 17 then as execution time in the time data memory 14a. And in the processing in steps 108 and 109, the comment data of the "program annotation portion" described together with the auxiliary function command "M999" is also stored in the comment data memory as shown in FIG. 4. Thereafter, the program proceeds to step 104 to execute the original command of the auxiliary function command "M999." For instance, if the auxiliary function command "M999" is a tool replacement command, the tool replacement is executed.

Hereafter, each time the auxiliary function command "M999" is read, the current time then is read from the clock circuit 17 and stored as execution time in the time data memory 14a in order of reading as shown in FIG. 4. And if there is comment data of the "program annotation portion," the comment data is stored together.

Next, it is assumed that a command of a "program number" is set and registered as reference time data command for specifying the reference time of the elapsed time, and an auxiliary function command "M888" is set and registered as elapsed time data command for recording elapsed time from the reference time.

Figure 5:
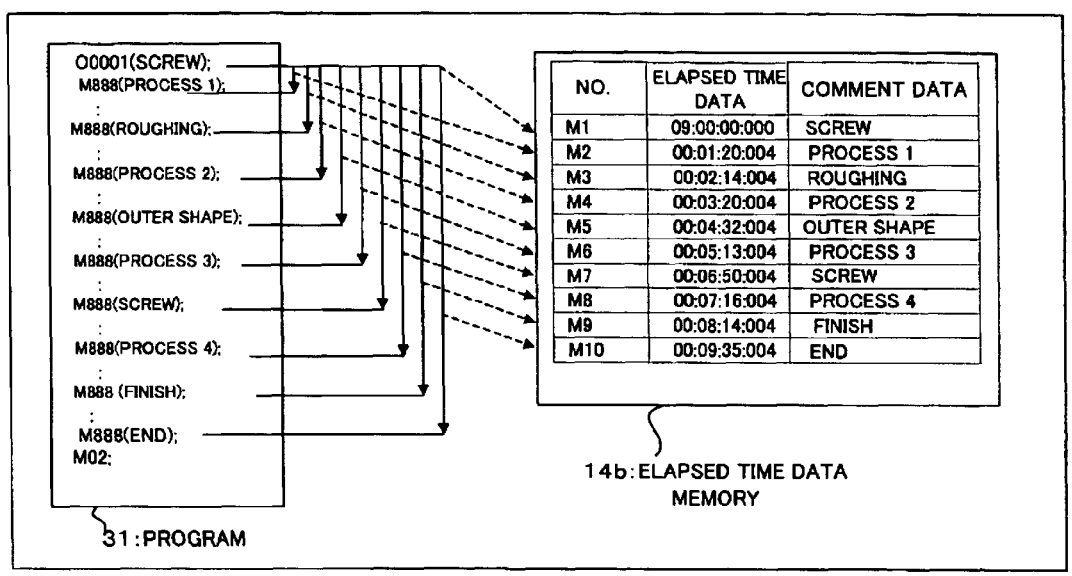
FIG. 5 is an explanatory diagram for explaining a relationship between the program and data stored in an elapsed time data memory according to the first embodiment.

FIG. 5 shows a relationship between the program and the data stored in the elapsed time data memory 14b by the execution of the program, in the above case. If the program number "00001" is read, the program proceeds from step 101 to step 105 so as to store the current time read from the clock circuit 17 then as reference time data at the head of the elapsed time data memory 14b. "09:00:00:000" is stored in the case of FIG. 5. And if there is comment data of the "program annotation portion" in the processing of steps 108 and 109, the comment data is stored together.

Thereafter, the program 31 is executed, and each time the auxiliary function command "M888", which is an elapsed time data command set and registered for recording elapsed time data from the program 31, is read, processing proceeds from step 102 to step 106, where the microprocessor 11 stores the elapsed time obtained by subtracting the reference time stored at the head of the elapsed time data memory 14b from the current time read from the clock circuit 17, that is, time elapsing from reading out and execution of the program number to reading out and execution of this auxiliary function command "M888", in the elapsed time data memory 14b, as an execution elapsed time. And as previously described, if there is a comment data of the "program annotation portion" described together with the auxiliary function command "M888," the comment data will also be stored in the comment data memory portion of the elapsed time data memory 14b. Thereafter, the microprocessor 11 executes an operation process of the original command of the auxiliary function command "M888" (step 104).

Thereafter, each time the program command of the auxiliary function command "M888" is read in order, the program number is read, and the elapsed time data and the comment data after the execution will be stored as shown in FIG. 5.

Figure 6:
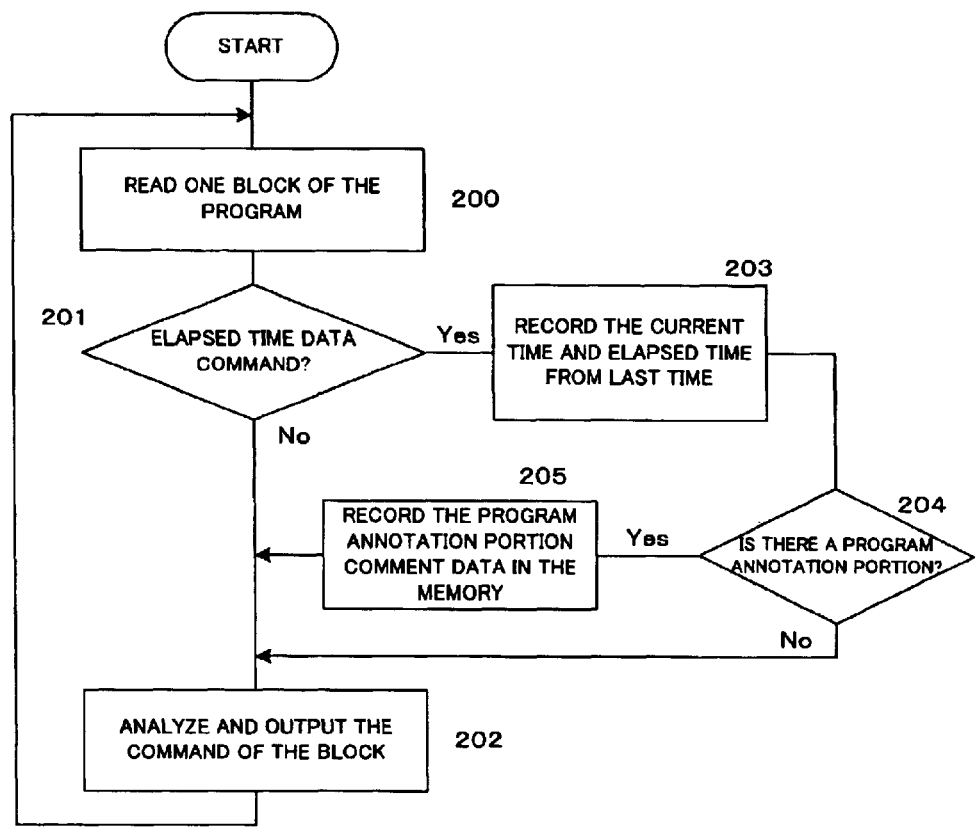
FIG. 6 is a flowchart of a program command analytic process according to a second embodiment.

FIG. 6 is a flowchart of the process executed by the microprocessor 11 according to a second embodiment of the present invention. According to the second embodiment, elapsed time between the program commands selected and set as elapsed time data commands is obtained and stored. The RAM 14 has a time/elapsed time data memory 14d for storing such elapsed time and time. And, in the program command setup data memory 14c of the RAM 14, program command for acquiring the elapsed time between the program commands is set and stored in advance as elapsed time data command.

Figure 7:
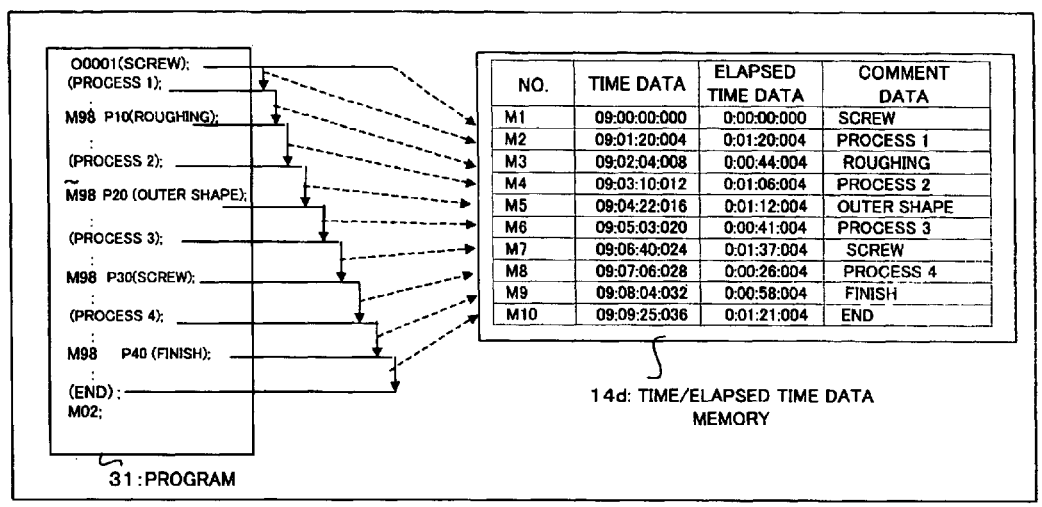
FIG. 7 is an explanatory diagram for explaining a relationship between the program and data stored in a time/elapsed time data memory according to the second embodiment.

FIG. 7 is a diagram for explaining a relationship between the program 31 and the data stored in the time/elapsed time data memory 14d. The program 31 in FIG. 7 has the program annotation portion described in "( )." As shown in FIG. 7, the program 31 includes the program command having the program annotation portion and the program command comprised only of the program annotation portion. And the elapsed time data is an elapsed time between a program command having a program annotation portion and a program command having the next program annotation portion.

The microprocessor 11 reads one block from the program 31 (step 200), and determines whether or not the program command of the read block is an elapsed time data command (command having the program annotation portion) set and registered in the program command setup data memory 14c (step 201). If it is not an elapsed time data command (if it has no program annotation portion), the microprocessor 11 executes the program command of the read block (step 202), and the program returns to step 200.

If the read program command is an elapsed time data command (command having the program annotation portion) registered in the program command setup data memory 14c, the program proceeds from step 201 to step 203, and the microprocessor 11 reads a current time from the clock circuit 17 to store the read time in the time/elapsed time data memory 14d. Furthermore, the microprocessor 11 acquires the time which has elapsed since storing an elapsed time based on the last program command, and stores the acquired elapsed time in the time/elapsed time data memory 14d. In the case where there is no data stored last time in the time/elapsed time data memory 14d initially, however, "0" is stored as elapsed time. And the microprocessor 11 determines whether or not there is a program annotation portion in the read program command (step 204), and the program proceeds to step 202 if there is no program annotation portion. If there is a program annotation portion, the microprocessor 11 stores the comment data of the program annotation portion in the comment data memory portion of the time/elapsed time data memory 14d (step 205), and the program proceeds to step 202. As for the example shown in FIG. 7, a command having a program annotation portion is considered a program command for storing an elapsed time. Therefore, comment data is stored in the comment data memory portion of the time/elapsed time data memory 14*d* without fail.

Thus, as shown in FIG. 7, the microprocessor 11 stores the time elapsing from a command having a program annotation portion to the subsequent command having a next program annotation portion, and also stores the time at which each command having a program annotation portion is read and executed together with the comment data of the program annotation portion.

As described above, the time and elapsed time data is stored in the time data memory 14*a* and the elapsed time data memory 14*b* according to the first embodiment or the time/elapsed time data memory 14*d* according to the second embodiment, provided as time data storage means in the RAM 14. When reading out such data, a time/elapsed time data display screen is selected by a screen selection operation on the display and operation panel 8 so as to read and display the time data and elapsed time data recorded in the RAM 14 based on the control program written to the ROM 13. The data is also transferred to the external information equipment 24 from the network control circuit 18 via the network 23, and is displayed on the display unit of the external information equipment 24 or printed out to review operation processing time of each command executed by the program command so that it is referred to on the program modification for reducing operating time, machining time and so on.

Figure 8:
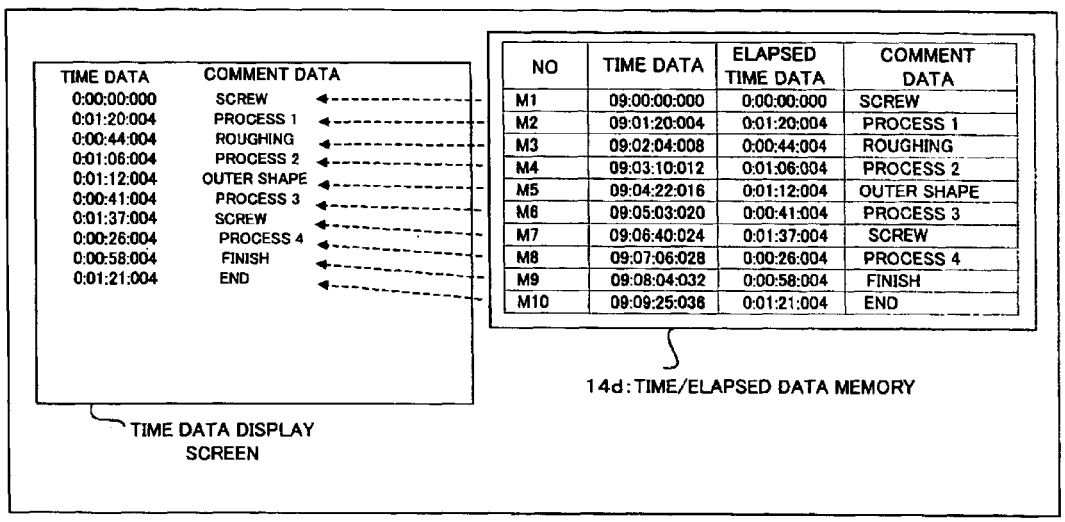
FIG. 8 is an explanatory diagram for describing a relationship between the data stored in the time/elapsed time data memory and display according to the second embodiment.

FIG. 8 is an explanatory diagram for explaining an example of the case of displaying the contents of the time/elapsed time data memory 14*d* shown in FIG. 7 on the display unit. This example shows the case where an elapsed time and comment data stored in the comment data memory portion are displayed. As a matter of course, time may also be displayed at the same time. As the elapsed time and a comment data are displayed together, it is possible to determine an overview of the machining and operation processing just on the display screen and see the elapsed time between the program commands (program annotation in the example in FIG. 8) so as to easily find the operation, machining and so on taking time.

The above-mentioned embodiments uses clock means as timekeeping means. However, it is also possible to use timekeeping means for starting time measuring in response to a timekeeping command. In this case, if it is determined that a reference time data command is read in step 101 in FIG. 3, a value of the timekeeping means is read in step 105 (timekeeping means is put in a reset state at first by initialization) and is written to the elapsed time data memory 14*b* ("0" is stored in this case) so as to start time measuring by the timekeeping means. And when it is determined that a timekeeping time data command is read in step 102, the processing in step 106 is changed to the processing of reading the value of the timekeeping means and storing the value in the elapsed time data memory 14*b*.

Thus, an elapsed time is stored in the elapsed time data memory 14*b*. In the example shown in FIG. 5 for instance, a data storage status of the elapsed time data memory 14*b* in this case is different from FIG. 5 only in that the elapsed time data of the number "M1" of the elapsed time data memory 14*b* is "0."

It is also possible to acquire execution timekeeping time between set and registered timekeeping time data by using the timekeeping means for measuring time from a timekeeping start command, instead of the clock means. In this case, in the processing shown in FIG. 6, the process in step 203 is changed to the process of reading the timekeeping data in the timekeeping means, writing it to the elapsed time data memory and resetting and starting the timekeeping means. The elapsed time data obtained at this time will be the data in FIG. 7 without the time data.

As described above, it is possible, according to the present invention, to easily measure program execution time which provides a judgment criterion for performing works including reviewing program commands for the sake of reducing time for machining according to the program.

A program command for recording time, elapsed time and so on can be set as using a program command used in an existing machining program. Therefore, it is possible to measure a program execution time without adding a new program command to the current machining program.

In a program operation, it is not only possible to display and select the time and elapsed time for the execution of the selected and set command with the display unit connected to the numerical control apparatus but also to use the time and timekeeping data as information for monitoring an execution status of the program operation by allowing them to be referred to from the outside or notified to the outside through communication means such as network as required.

What is claimed is:

1. A numerical control apparatus for controlling a machine tool comprising:

means for setting and registering any command, selected from among a plurality of commands described in a program handled by the numerical control apparatus, as a time data command for storing a time at which original contents of the command are executed;

clock means for updating a current time and outputting an updated current time;

determination means for determining whether or not the command read from the program during execution of the program is a time data command set and registered;

time data storage means; and means for, when the read command is determined to be the time data command by said determination means, acquiring the current time from the clock means, apart from execution of the original contents of the command, and writing the acquired time as an execution time to said time data storage means.

2. A numerical control apparatus for controlling a machine tool comprising:

means for setting and registering any command, selected from among a plurality of commands described in a program handled by the numerical control apparatus, as a reference time data command for storing a time at which original contents of the command are executed as a reference time;

means for setting and registering a command, different from said selected command, as an elapsed time data command for storing elapsed time from the reference time at which the original contents of the command are executed;

clock means for updating a current time and outputting an updated current time;

determination means for determining whether or not a command read from the command program during execution of the program is a command set and registered;

time data storage means;

means for, when determined to be the reference time data command set and registered by the determination means, acquiring the current time from the clock means, apart from execution of the original contents of the command, and writing the acquired time to a time data storage means as a reference time; and means for, when determined to be the elapsed time data command set and registered by the determination means, acquiring the current time from the clock means apart from the execution of the original contents of the command, calculating the elapsed time from the current time and the reference time and writing the calculated time to said time data storage means as an execution elapsed time.

3. A numerical control apparatus for controlling a machine tool comprising:

means for setting and registering any command, selected from among a plurality of commands described in a command program handled by the numerical control apparatus, as an elapsed time data command for storing elapsed time;

timekeeping means for measuring time;

determination means for determining whether or not the command read from the command program during execution of the command program is an elapsed time data command set and registered;

time data storage means; and means for, when determined to be the elapsed time data command by the determination means, acquiring the elapsed time from the execution time of the last elapsed time data command, apart from the execution of the original contents of the elapsed time data command, based on said timekeeping means and writing the acquired time to said time data storage means as the execution elapsed time.

4. A numerical control apparatus for controlling a machine tool comprising:

means for setting and registering any command, selected from among a plurality of commands described in a command program handled by the numerical control apparatus, as a reference time data command for storing the time at which the original contents of the command are executed as a reference time;

means for setting and registering a command, different from the selected command, as an elapsed time data command for storing elapsed time from the reference time at which original contents of the command are executed;

timekeeping means for measuring time;

determination means for determining whether or not the command read from the command program during the execution of the program is a command set and registered;

time data storage means;

means for, when determined to be the reference time data command by the determination means, causing the timekeeping means to start measuring time, apart from the execution of the original contents of the command; and means for, when determined to be the elapsed time data command set and registered by the determination means, acquiring the elapsed time measured by the timekeeping means, apart from the execution of the original contents of the command, and writing the acquired time to said time data storage means.

5. The numerical control apparatus according to claim 4, wherein:

said timekeeping means is comprised of clock means for outputting time; and said means for writing the execution elapsed time to the time data storage means reads, when determined to be the command set and registered, the time from the clock means and write the read time to said storage means, and also acquires the elapsed time from a difference between the time read out by the clock means this time and the time stored last time so as to write the acquired time as the execution elapsed time.

6. A numerical control apparatus for controlling a machine tool comprising:

means for setting and registering any command, selected from among a plurality of commands described in a command program handled by the numerical control apparatus, as an elapsed time data command for storing elapsed time;

timekeeping means for measuring time;

determination means for determining whether or not the command read from the command program during execution of the program is an elapsed time data command set and registered;

time data storage means; and means for, when determined to be the elapsed time data command by the determination means, reading the measured time from the timekeeping means, apart from the execution of the original contents of the elapsed time data command, writing the read time to said time data storage means as the execution elapsed time and resetting the timekeeping means to start time measuring.

7. The numerical control apparatus according to any one of claims 1 to 6, comprising:

means for determining whether the original content of the command set and registered is a program annotation portion itself or the command having the program annotation portion described in the same block as the command; and means for, when determined to have the program annotation portion, writing a comment registered as the program annotation portion together to the time data storage means.

8. The numerical control apparatus according to any one of claims 1 to 6, comprising means for displaying the data to be stored by the time data storage means on a display unit of the numerical control apparatus.

9. The numerical control apparatus according to any one of claims 1 to 6, comprising communication means for outputting the data to be stored by the time data storage means from the numerical control apparatus to the outside.

* * * * *